United States Patent
Li

(10) Patent No.: US 10,175,817 B2
(45) Date of Patent: Jan. 8, 2019

(54) METHOD AND APPARATUS FOR SWITCHING KEY FUNCTIONS OF TOUCHSCREEN TERMINAL

(71) Applicant: ZTE CORPORATION, Shenzhen (CN)

(72) Inventor: Xiaolei Li, Shenzhen (CN)

(73) Assignee: XI'AN ZHONGXING NEW SOFTWARE CO., LTD, Shaanxi (CN)

(*) Notice: Subject to any disclaimer, the term of this patent is extended or adjusted under 35 U.S.C. 154(b) by 0 days.

(21) Appl. No.: 15/508,602

(22) PCT Filed: Mar. 9, 2015

(86) PCT No.: PCT/CN2015/073913
§ 371 (c)(1),
(2) Date: Mar. 3, 2017

(87) PCT Pub. No.: WO2016/033951
PCT Pub. Date: Mar. 10, 2016

(65) Prior Publication Data
US 2017/0277347 A1    Sep. 28, 2017

(30) Foreign Application Priority Data
Sep. 3, 2014    (CN) .......................... 2014 1 0446085

(51) Int. Cl.
G06F 3/041    (2006.01)
G06F 3/048    (2013.01)
H01H 9/18    (2006.01)

(52) U.S. Cl.
CPC ............ G06F 3/0416 (2013.01); G06F 3/048 (2013.01); G06F 3/0412 (2013.01); H01H 9/181 (2013.01)

(58) Field of Classification Search
CPC ...... G06F 3/0416; G06F 3/0412; H01H 9/181
(Continued)

(56) References Cited

U.S. PATENT DOCUMENTS 8,786,555 B2 * 7/2014 Bloomcamp ........... G06F 3/016
178/18.01
2004/0257341 A1  12/2004 Bear et al.
(Continued)

FOREIGN PATENT DOCUMENTS

CN    103347134    10/2013
CN    103620540    3/2014

OTHER PUBLICATIONS

International Search Report for PCT/CN2015/073913, English Translation attached to original, Both completed by the Chinese Patent Office dated May 19, 2015 All together 5 Pages.
(Continued)

Primary Examiner — Prabodh M Dharia
(74) Attorney, Agent, or Firm — Plumsea Law Group, LLC

(57) ABSTRACT

The embodiments of the present document provide a method and an apparatus for switching key functions of a touchscreen terminal. The method includes: correspondingly setting a second function different from an original function for each physical key; after monitoring that a preset state of the physical key is enabled, executing the second function of the physical key; and after monitoring that the preset state of the physical key is disabled, executing the original function of the physical key. Based on the characteristics of the existing touchscreen operation and in combination with the characteristic of easy operability of the physical keys, the concurrency of actions of the touchscreen keys and the physical keys is realized.

4 Claims, 3 Drawing Sheets

(58) Field of Classification Search
USPC ....... 345/156–184; 455/418, 414.1; 715/764, 715/843
See application file for complete search history.

(56) References Cited

U.S. PATENT DOCUMENTS

| | | | | |
|---|---|---|---|---|
| 2008/0048986 | A1* | 2/2008 | Khoo | G06F 1/1615 345/168 |
| 2008/0062061 | A1* | 3/2008 | Gertz | G06K 7/0008 343/842 |
| 2008/0120559 | A1* | 5/2008 | Yee | G06F 1/1613 715/764 |
| 2009/0012952 | A1* | 1/2009 | Fredriksson | G06F 3/04842 |
| 2009/0046707 | A1* | 2/2009 | Smires | H04M 7/0069 370/352 |
| 2012/0071212 | A1* | 3/2012 | Endo | G06F 3/0236 455/566 |
| 2012/0246594 | A1* | 9/2012 | Han | G06F 3/0486 715/790 |
| 2012/0289828 | A1 | 11/2012 | Jensen et al. | |
| 2014/0149870 | A1 | 5/2014 | Griffin et al. | |
| 2014/0300491 | A1* | 10/2014 | Chen | A61B 5/0015 340/870.07 |
| 2014/0340310 | A1* | 11/2014 | Cheng | G06F 3/0487 345/158 |
| 2015/0113481 | A1* | 4/2015 | Liu | G06F 3/0488 715/843 |
| 2015/0193010 | A1* | 7/2015 | Tsukamoto | G06F 3/0219 345/169 |
| 2015/0207924 | A1* | 7/2015 | Kim | H04M 1/72583 455/414.1 |
| 2015/0253953 | A1* | 9/2015 | Mikami | H04M 1/67 345/173 |
| 2015/0264558 | A1* | 9/2015 | Wigton | G06K 9/0061 455/418 |
| 2016/0349990 | A1* | 12/2016 | Skillman | G06F 1/1626 |
| 2017/0329507 | A1* | 11/2017 | Yamamoto | F24F 11/30 |

OTHER PUBLICATIONS

Extended European Search Report dated Aug. 8, 2017 for European Patent Application No. 15838526.0.

* cited by examiner

METHOD AND APPARATUS FOR SWITCHING KEY FUNCTIONS OF TOUCHSCREEN TERMINAL

CROSS-REFERENCE TO RELATED APPLICATION

This application is the U.S. national phase of PCT Application No. PCT/CN2015/073913 filed Mar. 9, 2015, which claims priority to Chinese Application No. 201410446085.6 filed Sep. 3, 2014, the documents of which are incorporated in their entirety by reference herein.

TECHNICAL FIELD

The present document relates to the field of mobile communications, and in particular to a method and apparatus for switching key functions of a touchscreen terminal.

BACKGROUND

In the related art, the touchscreen has been increasingly applied in mobile terminals, a basic control method of the touchscreen is touching various icon buttons on the screen to implement specific functions, and the greatest advantage of such operation is strong interaction and visualized operation. For the mobile terminals especially for mobile hotspot devices, a small shape with more functions is usually one feature required by users. Therefore, if the screen is smaller, the amount of displayed information on the single screen and the easy operability of the interface may also become a contradiction and cannot be guaranteed at the same time. If the users look for icon buttons of the operation menu over and over again, it is likely to cause a misoperation due to inaccurate click positions.

With respect to the problem that the amount of displayed information on the single screen and the easy operability are contradictory with each other in the existing touchscreen operation, no effective solution has been proposed at present.

SUMMARY

The embodiments of the present document provide a method and an apparatus for switching key functions of a touchscreen terminal, to at least solve the problem that the amount of displayed information on the single screen and the easy operability are contradictory with each other in the touchscreen operation in the related art.

According to one aspect of the embodiments of the present document, the present document provides a method for switching key functions of a touchscreen terminal, herein, the method includes: correspondingly setting a second function different from an original function for each physical key; after monitoring that a preset state of the physical key is enabled, executing the second function of the physical key; and after monitoring that the preset state of the physical key is disabled, executing the original function of the physical key.

Alternatively, enabling or disabling the preset state of the physical key is monitored by means of: setting a preset touch spot on a touchscreen, and when monitoring that the preset touch spot is pressed, triggering to enable the preset state of the physical key; and when monitoring that the preset touch spot is loosened, triggering to disable the preset state of the physical key, and restoring to an original state.

Alternatively, enabling or disabling the preset state of the physical key is monitored by means of: executing a first preset operation on one or more physical keys, and triggering to enable the preset state of the physical key; executing a second preset operation on one or more physical keys, and triggering to disable the preset state of the physical key.

Alternatively, after monitoring that the preset state of the physical key is disabled, the method further includes: executing an original function of a touchscreen key.

Alternatively, the physical keys include at least one of the following: an on-off key, a volume up key, a volume down key and a master control key.

According to another aspect of the embodiments of the present document, the present document further provides an apparatus for switching key functions of a touchscreen terminal, herein, the apparatus includes: a function setting module, arranged to correspondingly set a second function different from an original function for each physical key; a first operation module, arranged to: after monitoring that a preset state of the physical key is enabled, execute the second function of the physical key; and a second operation module, arranged to: after monitoring that the preset state of the physical key is disabled, execute the original function of the physical key.

Alternatively, the first operation module includes: a first enablement unit, arranged to: set a preset touch spot on a touchscreen, and when monitoring that the preset touch spot is pressed, trigger to enable the preset state of the physical key; the second operation module includes: a first disablement unit, arranged to: when monitoring that the preset touch spot is loosened, trigger to disable the preset state of the physical key, and restore to an original state.

Alternatively, the first operation module includes: a second enablement unit, arranged to: execute a first preset operation on one or more physical keys, and trigger to enable the preset state of the physical key; the second operation module includes: a second disablement unit, arranged to: execute a second preset operation on one or more physical keys, and trigger to disable the preset state of the physical key.

Alternatively, the second operation module is further arranged to: after monitoring that the physical key restores to the original state, execute an original function of a touchscreen key.

Alternatively, the physical keys include at least one of the following: an on-off key, a volume up key, a volume down key and a master control key.

In the present document, based on the characteristics of the existing touchscreen operation and in combination with the characteristic of easy operability of the physical keys, the concurrency of actions of the touchscreen keys and the physical keys is realized, which solves the problem that the amount of displayed information on the single screen and the easy operability are contradictory with each other in the existing touchscreen operation, avoids the situation that the touchscreen is uneasy to operate or the misoperation easily occurs on the touchscreen, expands the normal operation modes of users, improves the usability of devices, and enhances the user experience.

The above description is only an overview of the technical scheme of the present document, in order to comprehend the technical means of the present document more clearly, it may be implemented in accordance with the contents of the summary, and in order to make the above-mentioned and other objects, characteristics and advantages of the present document more evident and understandable, specific embodiments of the present document will be particularly illustrated below.

DETAILED DESCRIPTION

In order to solve the problem that the amount of displayed information on the single screen and the easy operability are contradictory with each other in the existing touchscreen operation, the present document provides a method and apparatus for operating keys of a touchscreen terminal, and the present document will be further described in detail in combination with the accompanying drawings and embodiments below. It should be understood that the specific embodiments described here are only used to explain the present document, which does not limit the present document.

Figure 1:
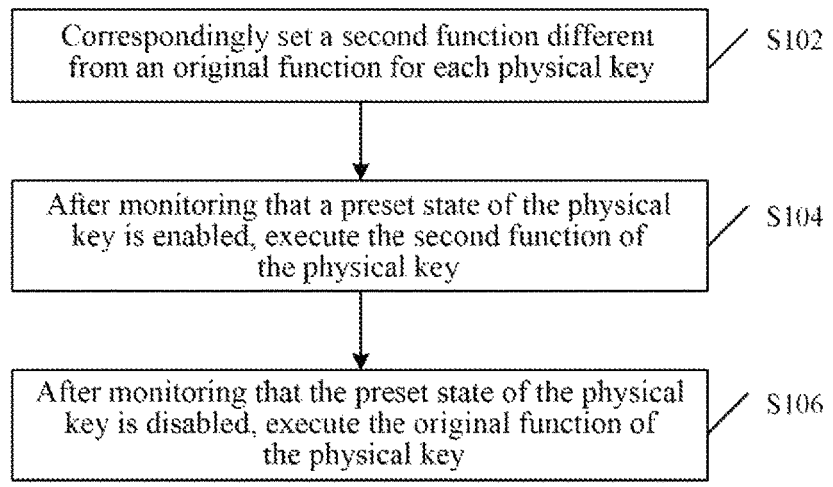
FIG. 1 is a flow chart of a method for switching key functions of a touchscreen terminal according to an embodiment of the present document.

The embodiment provides a method for switching key functions of a touchscreen terminal, and the method may be implemented at a touchscreen terminal device side. FIG. 1 is a flow chart of a method for switching key functions of a touchscreen terminal according to an embodiment of the present document, and as shown in FIG. 1, the method includes the following steps (step S102-step S106).

In step S102, a second function different from an original function is correspondingly set for each physical key.

In the embodiment, the above physical keys are entity keys on the terminal device and they specifically include at least one of the following: an on-off key, a volume up key, a volume down key, a master control key or other possible entity keys.

In step S104, after monitoring that a preset state of the physical key is enabled, the second function of the physical key is executed.

In step S106, after monitoring that the preset state of the physical key is disabled, the original function of the physical key is executed. Meanwhile, an original function of a touchscreen key is executed.

Through the embodiment, in combination with the characteristic of easy operability of the physical keys, the concurrency of actions of the touchscreen keys and the physical keys is realized, which solves the problem that the amount of displayed information on the single screen and the easy operability are contradictory with each other in the existing touchscreen operation, avoids the situation that the touchscreen is uneasy to operate or a misoperation easily occurs on the touchscreen, expands the normal operation modes of users, improves the usability of devices, and enhances the user experience.

In the embodiment, the preset state of the physical key is a special state, in a normal state, the function corresponding to the physical key is the original function. For example, a function corresponding to the on-off key is startup and shutdown; and in the special state, the function corresponding to the physical key is the above second function, namely other functions different from the original function, and what kind of the second function may be set according to the practical situation.

In the embodiment, enabling and disabling the preset state of the physical key may be triggered in different ways, such as: setting a preset touch spot on a touchscreen, and when monitoring that the preset touch spot is pressed, triggering to enable the preset state of the physical key; and when monitoring that the preset touch spot is loosened, triggering to disable the preset state of the physical key, and restoring to an original state. Herein, the shape of the touch spot is not limited, and it may be a dot or a square or rectangular touch area and the like.

Or, a first preset operation is executed on one or more physical keys, so as to trigger to enable the preset state of the physical key; and a second preset operation is executed on one or more physical keys, so as to trigger to disable the preset state of the physical key. For example, a volume up key has been long pressed for at least 3 s, it triggers to enable the preset state of the physical key, and then the volume up key is double clicked, it triggers to disable the preset state of the physical key. Certainly, other preset operations may also be designed, and it is only required that the effect of triggering to enable or disable the preset state can be achieved.

Figure 2:
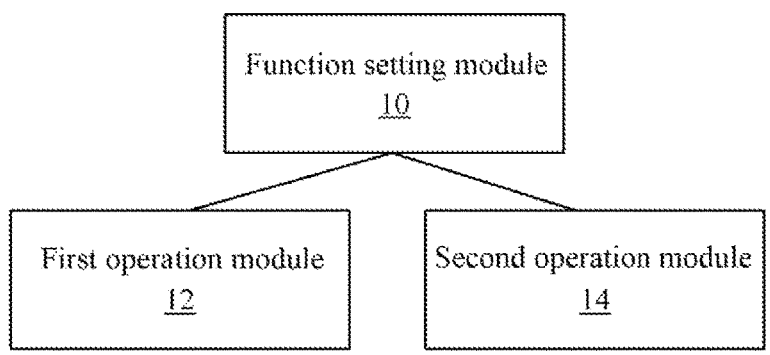
FIG. 2 is a block diagram of a structure of an apparatus for switching key functions of a touchscreen terminal according to an embodiment of the present document.

Corresponding to the method for switching the key functions of the touchscreen terminal introduced in the above embodiment, the embodiment provides an apparatus for switching key functions of a touchscreen terminal, and the apparatus may be set at a touchscreen terminal device side, so as to implement the above embodiment. FIG. 2 is a block diagram of a structure of an apparatus for switching key functions of a touchscreen terminal according to an embodiment of the present document, and as shown in FIG. 2, the apparatus includes: a function setting module 10, a first operation module 12 and a second operation module 14. The structure will be introduced in detail below.

The function setting module 10 is arranged to correspondingly set a second function different from an original function for each physical key;

the first operation module 12 connected to the function setting module 10 is arranged to: after monitoring that a preset state of the physical key is enabled, execute the second function of the physical key; and the second operation module 14 connected to the function setting module 10 is arranged to: after monitoring that the preset state of the physical key is disabled, execute the original function of the physical key.

In the embodiment, the second operation module 14 is further arranged to: after monitoring that the physical key restores to the original state, execute an original function of a touchscreen key.

In the embodiment, the physical keys are entity keys and may include at least one of the following: an on-off key, a volume up key, a volume down key and a master control key.

In the embodiment, the first operation module 12 includes: a first enablement unit, arranged to: set a preset touch spot on a touchscreen, and when monitoring that the preset touch spot is pressed, trigger to enable the preset state of the physical key; the second operation module 14 includes: a first disablement unit, arranged to: when monitoring that the preset touch spot is loosened, trigger to disable the preset state of the physical key, and restore to an original state.

Or, the first operation module 12 includes: a second enablement unit, arranged to: execute a first preset operation on one or more physical keys, and trigger to enable the preset state of the physical key; the second operation module 14 includes: a second disablement unit, arranged to: execute a second preset operation on one or more physical keys, and trigger to disable the preset state of the physical key.

Figure 3:
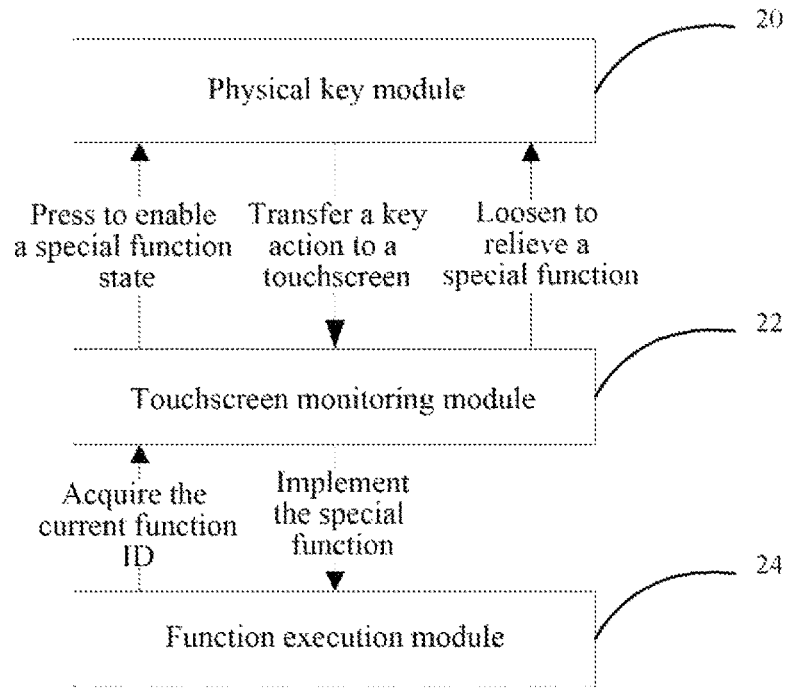
FIG. 3 is a block diagram of a structure of a touchscreen operation apparatus according to an embodiment of the present document.

In order to explain a specific function execution process of the technical scheme of the present document more clearly, the embodiment introduces a touchscreen operation apparatus to expand the user operation modes by means of combining a touchscreen operation and a physical key operation, so as to achieve the purpose of expanding and perfecting the operation functions. FIG. 3 is a block diagram of a structure of a touchscreen operation apparatus according to an embodiment of the present document, and as shown in FIG. 3, the apparatus includes: a physical key module 20, a touchscreen monitoring module 22 and a function execution module 24. Each module will be introduced below.

The physical key module 20 is mainly responsible for acquiring operations of a user on physical keys on the terminal device, the physical keys mentioned in the present document refer to entity keys different from virtual key on the touchscreen on the device, and generally at least one on-off key exists to serve as the entity key on the mobile terminal device. The physical keys may respond to the user's normal operations, such as actions like click, double click and long press and so on, and the implementation way is transferred to the touchscreen for special function operations.

The touchscreen monitoring module 22 is mainly arranged to monitor the user's touchscreen operations, if the user's touch position is within the above special area (i.e. the preset touch spot introduced in the above embodiment), inform the physical key module 20 to conduct an operation with special function (i.e. the second function introduced in the above embodiment); and if the user's touch position is not within the above special area, it conducts a normal touchscreen operation.

The function execution module 24 mainly accepts calling to the functions from the touchscreen monitoring module 22, which implements specific user operation functions. The touchscreen monitoring module 22 may send corresponding function serial numbers to the function execution module 24 with respect to different operations, and the function execution module 24 performs specific function operations according to the serial numbers.

In the embodiment, the physical key module 20 is vitally important, and it mainly depends on actions like pressing and lifting of the device physical keys, reported by a key drive, to judge the user's specific operations on the device physical keys, and implements calling the related software functions according to the user's key actions.

Furthermore, the physical key module may distinguish specific key implementation functions through operation states transferred by the touchscreen. If the touchscreen monitoring module 22 requires that the physical key should conduct an auxiliary function operation, the physical key directly transfers a user operation to the touchscreen monitoring module 22. If no special function information is received when the physical key is operated, a normal key function is implemented. The touchscreen monitoring module 22 sends the corresponding function to the function execution module 24 according to the user operation transferred by the physical key. If the user loosens the special touch spot or touch area on the touchscreen, the special function of the physical key is relieved.

The workflows of the physical key module and the touchscreen monitoring module will be introduced respectively below in combination with various modules introduced in the above embodiment.

Figure 4:
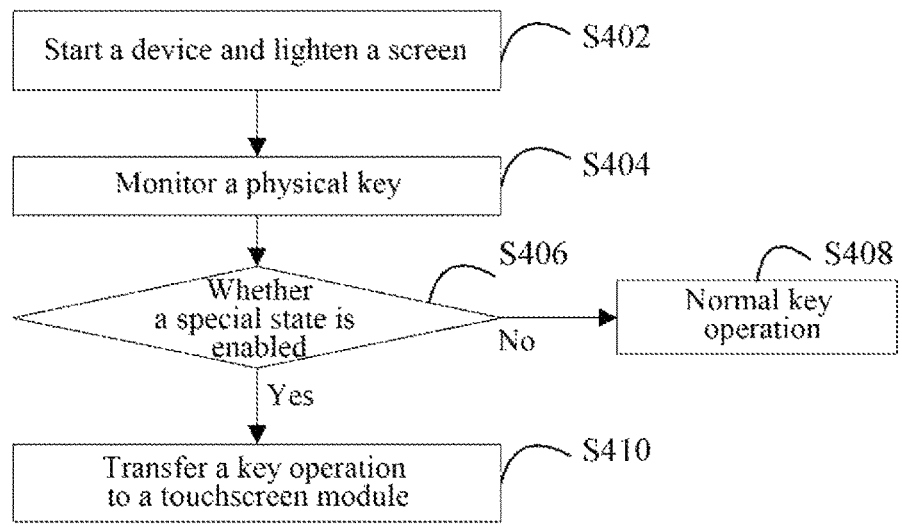
FIG. 4 is a workflow chart of a physical key module according to an embodiment of the present document.

FIG. 4 is a workflow chart of a physical key module according to an embodiment of the present document, and as shown in FIG. 4, the workflow includes the following steps (step S402-step S410).

In step S402, a mobile terminal device starts up and the screen is lightened.

In step S404, the thread is started to monitor actions of a physical key, including actions like click, double click and long press, that are easily operated by the user, of the physical key.

In step S406, it is to query whether a special state of the physical key is enabled, if the special state of the physical key is enabled, execute step S410, and if the special state of the physical key is not enabled, skip to step S408.

In step S408, a regular function (or called an original function) of the physical key is executed.

In step S410, a key operation is sent to a touchscreen monitoring module, and the touchscreen monitoring module implements calling a specific function according to a pre-defined function list.

Figure 5:
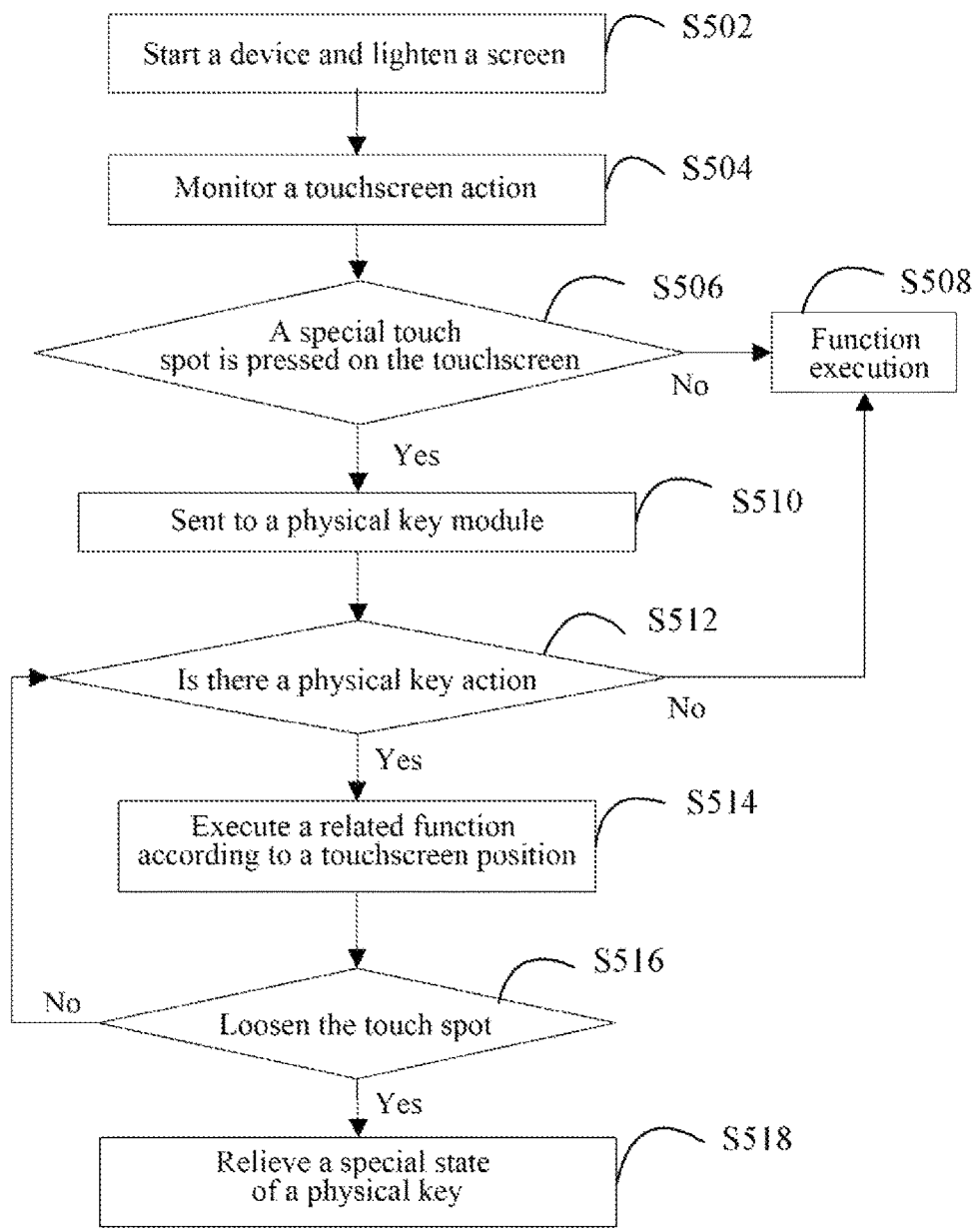
FIG. 5 is a workflow chart of a touchscreen monitoring module according to an embodiment of the present document.

FIG. 5 is a workflow chart of a touchscreen monitoring module according to an embodiment of the present document, and as shown in FIG. 5, the workflow includes the following steps (step S502-step S518).

In step S502, a mobile terminal device starts up and the screen is lightened, and a touchscreen action may be responded at this point.

In step S504, a touchscreen monitoring module begins to start the thread so as to monitor a user's touchscreen pressing and lifting actions.

In step S506, it is to judge whether a touch spot (or a touch area) with special meanings is pressed on the touchscreen, if the touch spot (or the touch area) with special meanings is pressed, execute step S510, and if the touch spot (or the touch area) with special meanings is not pressed, execute step S508.

In step S508, if a touch spot of a common area is pressed, a regular touchscreen operation is conducted.

In step S510, if a touch spot of a special area is pressed, it is sent to a physical key module.

In step S512, before the above touch spot is loosened, it is to judge whether a key action is transferred from the physical key module, if the key action is transferred from the physical key module, execute step S514, and if the key action is not transferred from the physical key module, execute step S508 and execute a normal touchscreen operation.

In step S514, a related function ID is called according to the position of a touch spot and sent to a function execution module.

In step S516, it is to monitor whether the touch spot is loosened, if the touch spot has been loosened, execute step S518, and if the touch spot has not been loosened, continue to monitor the user's physical key actions at the step S512.

In step S518, the physical key module is informed to relieve its special state.

The above two embodiments introduce the workflows of the physical key module and the touchscreen monitoring module, and an expansible application is provided for the users on the touchscreen terminal by combining with the operations of the physical keys. On the one hand, if certain operations of the touchscreen are easy to cause misoperations to the users, the present document may be used as backup operations to the touchscreen operations so as to implement specific functions, on the other hand, it may also be used as a shortcut of an expansible function and provided for the users. No matter which kind of scenario it is applied to, better user experience will be brought to the users.

In the present document, based on the characteristics of the existing touchscreen operation and in combination with the characteristic of easy operability of the physical keys, the concurrency of actions of the touchscreen keys and the physical keys is realized, which avoids the situation that the touchscreen is uneasy to operate or a misoperation easily occurs on the touchscreen, improves the usability of devices by expanding the operation modes of users, and definitely enhances the user experience.

In conclusion, the operation modes of users may be expanded based on the original touchscreen and key operations with the present document, thus certain defects of the existing operation may be perfected, and more operation functions are provided for the users, which has good user experience.

Though the embodiments of the present document have been disclosed for the purpose of illustrations, the people skilled in the art will realize that various improvements, additions and replacements are also possible, and therefore, the scope of the present document should not be limited to the above embodiments.

INDUSTRIAL APPLICABILITY

As mentioned above, a method and apparatus for switching key functions of a touchscreen terminal provided in the embodiments of the present document have the following beneficial effects: the situation that the touchscreen is uneasy to operate or a misoperation easily occurs on the touchscreen is avoided, the normal operation modes of users are expanded, the usability of devices is improved, and the user experience is enhanced.

What we claim is:

1. A method for switching key functions of a touchscreen terminal, comprising:
    correspondingly setting a second function different from an original function for each physical key;
    after monitoring that a preset state of the physical key is enabled, executing the second function of the physical key; and
    after monitoring that the preset state of the physical key is disabled, executing the original function of the physical key,
    wherein enabling or disabling the preset state of the physical key is monitored by steps of:
    setting a preset touch spot on a touchscreen, and when monitoring that the preset touch spot is pressed, triggering to enable the preset state of the physical key; and
    when monitoring that the preset touch spot is loosened, triggering to disable the preset state of the physical key, and restoring to an original state,
    wherein after monitoring that the preset state of the physical key is disabled, further comprising: executing an original function of a touchscreen key.

2. The method according to claim 1, wherein the physical keys comprise at least one of the following: an on-off key, a volume up key, a volume down key and a master control key.

3. An apparatus for switching key functions of a touchscreen terminal, comprising:
    a function setting module, arranged to correspondingly set a second function different from an original function for each physical key;
    a first operation module, arranged to: after monitoring that a preset state of the physical key is enabled, execute the second function of the physical key; and
    a second operation module, arranged to: after monitoring that the preset state of the physical key is disabled, execute the original function of the physical key,
    wherein the first operation module comprises: a first enablement unit, arranged to: set a preset touch spot on a touchscreen, and when monitoring that the preset touch spot is pressed, trigger to enable the preset state of the physical key;
    the second operation module comprises: a first disablement unit, arranged to: when monitoring that the preset touch spot is loosened, trigger to disable the preset state of the physical key, and restore to an original state,
    wherein the second operation module is further arranged to: after monitoring that the physical key restores to the original state, execute an original function of a touchscreen key.

4. The apparatus according to claim 3, wherein the physical keys comprise at least one of the following: an on-off key, a volume up key, a volume down key and a master control key.

* * * * *